United States Patent Office 3,522,356
Patented July 28, 1970

3,522,356
ELECTRIC FURNACE CORONA MELTING PROCESS
Leonard E. Olds, 2637 Stony Point Road, Grand Island, N.Y. 14072; Nickolas J. Themelis, 24 Fieldfare Ave., Beaconsfield, Quebec, Canada; Fritz O. Wienert, 394 Roosevelt Ave., Niagara Falls, N.Y. 14305; and Murray C. Udy, deceased, late of Niagara Falls, N.Y., by Mary S. Udy, executrix, 818 Cayuga Drive, Niagara Falls, N.Y. 14304
Filed May 27, 1968, Ser. No. 732,469
Int. Cl. H05b 3/60; C21c 5/52
U.S. Cl. 13—31      9 Claims

ABSTRACT OF THE DISCLOSURE

The higher the power input to an electric furnace during smelting and/or melting operations, the higher the output will be. In conventional operation, slag foaming and refractory damage limit the power input, particularly in the later stages of a heat. In the present invention, the electrodes are exactly positioned for "corona" heating and, by correlating slag temperature, composition and viscosity, and charging rate, with the degree of metallization of the charge, power input and metal production are maximized. Foaming and refractory damage are avoided. The invention is particularly adapted to producing iron and steel from all types of iron and iron oxide-bearing charge materials.

---

This invention relates generally to electric furnace operation, and more particularly, it relates to the smelting and/or melting of ores, rereduced or metallized materials, and sponge iron and scrap, under conditions controlled to avoid damage to furnace refractories, oxidation of finely divided scrap, and slag foaming while, at the same time, being fast and efficient.

Understanding of the invention requires that the differences and the similarities in the electric furnace smelting of ores and the melting of metallized burdens of scrap be appreciated.

While both virgin ores and metallic scrap materials are processed in electric furnaces, these two raw materials are sufficiently different in their properties so as to require different types of furnace equipment. Ores and concentrates, for example, are characterized by having large quantities of oxygen chemically bonded to the metal. Ores are "smelted" in order to break this chemical bond yielding oxygen in the off-gases (usually combined with carbon to form CO or $CO_2$) and molten metal which, because of its density, sinks to the bottom of the furnace. The remaining oxides (gangue constituents), which have not had chemical bonds broken, combine together with or without added fluxes, to form a molten layer of slag which floats on top of the molten metal. For example, a normal hematite iron ore containing 55% iron will yield, when smelted, approximately 24,000 cubic feet of gases (S.T.P.) and about 0.6 ton of fluxed slag for every ton of molten iron produced. A 65% magnetite iron ore concentrate will yield approximately 21,000 cubic feet of gases (S.T.P.) and about 0.3 ton of fluxed slag for every ton of molten iron produced. The removal of such large quantities of gases, and the handling of large slag volumes, is a major consideration in the construction and operation of electric smelting furnaces. These considerations result in low power loadings on the hearth and large, cumbersome, electrodes. For pure "smelting" operations (i.e., no metallic iron present in charge) power loadings of 15 to 20 kw./sq. ft. of hearth are typical. Electrodes reach as large as 6 feet in diameter.

Scrap metals, on the other hand, have relatively little combined oxygen, so that electric ore processing of scrap involves principally melting, and only minor amounts of smelting. Only small volumes of gas are evolved, and only a small quantity of slag is formed. No. 1 scrap bundles, for example, will generally yield less than 500 cubic feet of gases and 80 pounds of fluxed slag per ton of molten iron melted. For scrap melting, power loadings reach as high as 220 kw./sq. ft. of hearth area. Smaller diameter electrodes, from 6 to 28", are used.

The distinction between scrap melting furnaces and ore smelting furnaces became less well defined some years ago when Udy invented a method for electric furnacing of a prereduced charge (see U.S. Pats. No. 2,805,929 and No. 2,805,930). In this process, the ore has from 30 to 98% of its combined oxygen removed by a pre-treatment in a furnace such as a rotary kiln, prior to actual melting of the charge in the electric furnace. This prereduced charge is then melted by heat generated from electrodes which are positioned from ½" above the slag to about 2" immersed in the slag, by what is called "combination arc-resistance, slag-resistance heating." Care is taken to insure that the electrodes are not wetted by the slag. The normal submerged arc smelting process has several feet of furnace burden and cannot be used with prereduced burdens, since it is essential for such burdens to either keep the immediate vicinity around the electrodes free of charge or to keep the height of the burden in the vicinity of the electrode less than 12 inches, depending on the degree of prereduction.

In addition to prereduced ores, concentrates, pellets, and the like, there exists a class of metal such as turnings, grindings, swarf, powdered iron and sponge iron, all of which are characterized by having a high surface-to-volume ratio. These materials are often highly oxidized or they become oxidized in the furnace so that they cannot be processed under the same conditions in scrap melting furnaces as for heavier scrap. A suitable process for treating these materials is described in copending U.S. application Ser. No. 579,790, filed Sept. 15, 1966, now U.S. Pat. No. 3,385,494, issued May 28, 1968.

While it is possible by proper feeding to process prereduced ores and highly metallized charges in conventional smelting furnaces, it has been found that these furnaces are generally wasteful of furnace volume in comparison with scrap melting furnaces. Furthermore, there has never existed any means for relating the changes that must be made to furnace transformers and electrodes to provide the most efficient smelting and melting of these prereduced or finely divided metallic materials. On the other hand, the normal scrap melting furnaces utilize long arcs and, as a result, are wasteful of heat and refractories, particularly in the "flat bath" period. Lastly, while other workers have specified electrode positioning in the general vicinity of the slag surface, it has not been possible to specify exactly where this should be or how it should be maintained.

OBJECTS OF THE INVENTION

It is a general object of the present invention to provide an improved method of electric furnace operation adaptable to any of the above-described burdens.

Another object of the invention is to provide a process for electric furnace smelting and/or melting of a burden which maximizes power loading and metal production without causing slag foaming or refractory damage.

A still further object of the invention is to provide a method of electric furnace operation which can treat any of the above-described burdens with the same efficiency and in a single furnace.

It is a further object of the invention to provide a process adaptable to many different types of metallized charges at the same throughput efficiencies in a single furnace.

Another object of the invention is to provide design parameters for different types of processing to enable proper selection of equipment, furnace, and electrode sizes, and to set transformer specifications.

Yet another object of the invention is to provide a method of controlling furnace charging and power input which will produce the desired metallurgical composition of both metal and slag on a continuous basis.

A further object of the invention is to provide a method for exactly positioning electrodes for optimum operation based on readily-determined process variables.

Various other objects and advantages of the invention will become clear from the following detailed description of embodiments thereof, and the novel features will be particularly pointed out in connection with the appended claims.

THE DRAWINGS

DESCRIPTION OF EMBODIMENTS

The objects and advantages of the invention are achieved, in part, by what is referred to herein as corona heating or corona discharge heating in the furnace. When melting prereduced or metallized materials, it has been found that, when the electrode tips physically touch the slag, a corona-type discharge rather than an arc-type discharge occurs. Since the corona is a type of glow discharge, no arcing occurs and, as a result, power factors are high and the rate of electrode consumption is very low. However, as the electrode tip penetrates the slag layer, a critical immersion level is subsequently reached where the rate of electrode consumption increases rapidly. This critical point occurs at approximately one inch below the electrode position at which the initial corona discharge was established. However, as the operating voltage is increased, the higher electrical pressure at the electrode tip tends to push the slag away from the electrodes. Under these conditions the initial corona-type contact between the electrodes and the slag must be made at a level somewhat below the surface level of the slag bath. The critical level for avoiding high electrode consumption remains at about a one inch penetration after the initial corona-type contact is made. However, because high electrical pressure depresses the slag surface, the critical level may be several inches below the surface level of the slag. Nevertheless, contact between the electrodes and the slag (which may be peripheral) is required for corona heating. As set forth below, a method has been devised for accurately positioning the electrodes for this kind of heating.

The establishing of proper heating by a corona discharge is not difficult in a small furnace since it is generally possible from time-to-time to observe the electrodes directly. However, on large production furnaces equipped with large diameter electrodes operating at high voltages, it is in practice most difficult to regulate electrodes visually so that they are properly positioned for efficient and economical corona heating.

Figure 1:
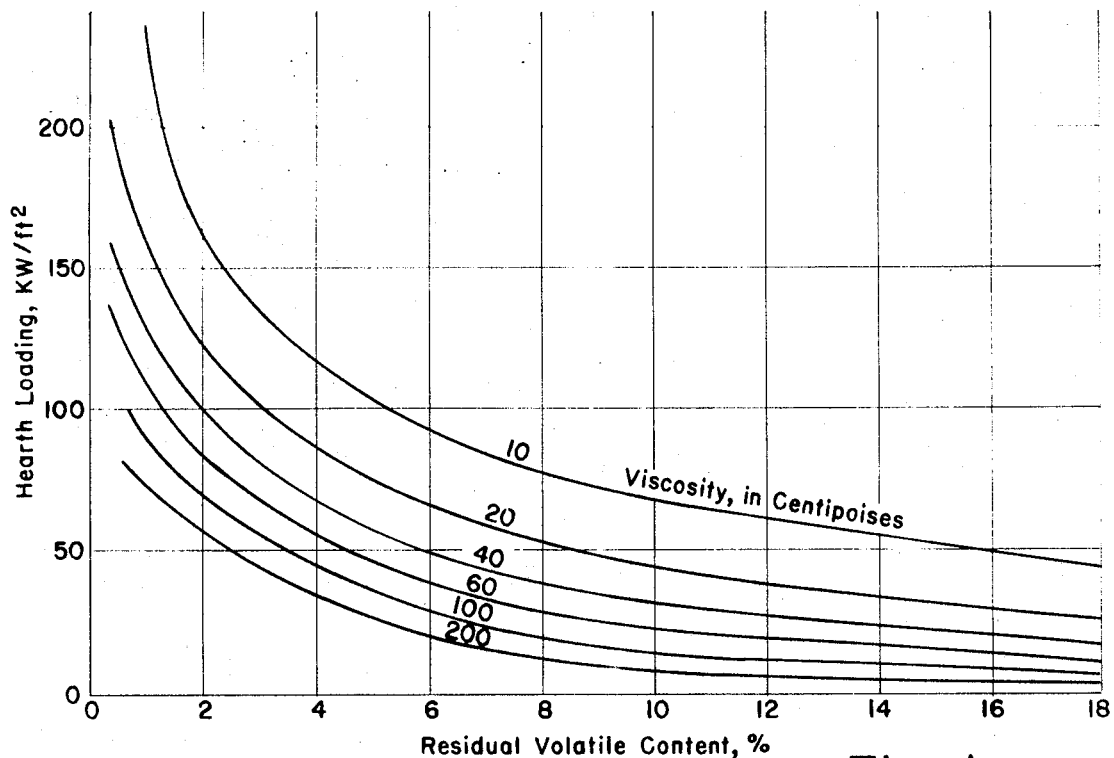
FIG. 1 is a plot showing the relation of residual volatile content of the charge to available hearth power loading, for slags of six viscosities.

It has been determined that in a furnace heated by a corona discharge, there exists a relationship between viscosity of the slag and the residual volatile content of the charge such that various power loadings on the hearth may be successfully obtained by varying the viscosity of the slag in accordance with the curves shown in FIG. 1. The residual "volatile" content of the charge is defined as the total amount of those constituents which will be readily emitted as gases and vapors upon melting and/or smelting of the charge. Included in this category are the following types of gassifiable constituents:

Residual oils and hydrocarbons
Free residual water
Combined water of hydration
Residual carbonates (partially burnt lime, etc.)
Residual oxygen from the desired metal reduction reactors (nickel, iron, manganese, chromium, etc.)
Residual volatile matter in the reductant.

Not included are the fumes from undesired high temperature side reactions such as silica reduction, since these side reactions can be effectively minimized by proper furnace operation. It will be appreciated that insofar as residual oxygen is a major component of the total volatile content, the degree of metallization and the residual volatile content will be inversely related. Since the other listed gas-formers must also be taken into account, however, we prefer to correlate viscosity and residual volatile content.

Thus, it has been found that in an electric scrap melting furnace which has an initial hearth loading of 60 kw./sq. ft. a 90% metallized burden containing 3.5% residual volatiles could be successfully melted, provided slags having a viscosity of no more than 60 centipoises are maintained. By decreasing slag viscosity to less than 10 centipoises, hearth loadings for this material could be raised to over 125 kw./sq. ft. In a smelting furnace operating on a 40% metallized burden, 8.5% residual volatiles, and a hearth loading of 15 kw./sq. ft. with a 120 centipoise slag, it was possible to increase the hearth loading close to 75 kw./sq. ft. by operating with a 10 centipoise slag.

It is to be noted that the degree of metallization of a burden is the percent of iron (or whatever) in the metallic state. This is distinct from the degree of reduction or prereduction, which indicates the percentage of combined oxygen that has been removed. Thus, a charge that is reduced 40% may be only 1 or 2% metallized. Conversely, a burden that is 40% metallized has probably been reduced over 80%.

Viscosity of a slag is affected by both temperature and composition. Since, in the corona furnace, there is no excessive amount of furnace burden at any given time, slag temperature may be closely controlled by adjusting the rate of feeding in relationship to the power. In general, a 10 centipoise slag is attained at a temperature of 200° C. in excess of the final melting temperature. In the instances when it is desired to maintain a given slag temperature, the slag viscosity may be varied by variations in fluxing practice. There is an abundance of information now available in the literature regarding the effects of lime, magnesia, and alumina on the viscosity of silicate slags (see, for example, Turkdogan & Bell, "A Critical Review of Viscosity of $CaO-MgO-Al_2O_3-SiO_2$ Melts," Ceramic Bull., vol. 39, No. 11, 1960, and Machin & Hanna, "Viscosity Studies of System $CaO-MgO-Al_2O_3-SiO_2$," J. American Ceramic Society, vol. 28, No. 11, pp. 310–16, 1945). For slag compositions not covered in the literature, viscosity may be estimated by an experienced melter according to the rate at which the slag runs off an iron stirring rod. A 5 centipoise slag runs off the rod very rapidly, while a 10 centipoise slag will have a slight tendency to stick to the rod. A 50 centipoise slag will form definite droplets as well as thicker coating on the rod, and a 250 centipoise slag will not readily run completely off.

For the purposes of melting prereduced charges in a corona heated furnace it has been found impossible to obtain, from existing sources, published or private, design parameters which would allow efficient and accurate sizing of hearth diameters, size, types of electrode and voltage ranges on the transformers. Attempts to use the peripheral ohm "$k$" factor, which has been successfuly applied to submerged arc furnaces, is not applicable to the corona heated furnace (see W. M. Kelly, "Design and Construction of the Submerged Arc Furnace," Carbon and Graphite News, Union Carbide Corp., vol. 5, No. 1, April/May, 1958). After considerable study and experimentation, it has been determined, surprisingly, that in the corona furnace over 95% of the heat is generated at the electrode tips rather than in the slag or metal itself, irrespective of electrode spacing or slag depth. Observations have indicated that when carbonaceous electrodes are in contact with the slag, there exists an extremely thin gas layer between the electrode and the slag. As long as this layer remains relatively thin, the corona discharge occurs across it readily and there is no arcing. This gaseous layer occurs over the entire electrode surface area wherever there is a true contact and penetration of the slag by the electrode.

Because of the need for maintaining a stable gas layer it is essential for successful operation of a corona furnace to maintain a minimum slag layer of from ½ to 1 inch thick betwen the electrode tips and the molten metal in the bottom of the furnace.

The electrical resistance associated with the corona discharge at a single electrode may be expressed by the following equation $$R = \rho t / A \quad (1)$$

where $\rho$ is the resistivity of the interfacial film, $t$ is the film thickness and A is the total electrode area in contact with the slag. For noncored, round electrodes, this contact area is defined as follows:

$$A = \frac{\pi d^2}{4} + \pi dl \quad (2)$$

where $d$ is the electrode diameter and $l$ is the depth of physical contact of the electrode by the slag. In the case of cored electrodes, the area of the inside hole which is in contact with the slag is included. This, however, results in only a small correction and can generally be ignored.

Since it is most difficult to measure either $\rho$ or $t$, it is preferred to express their product as an interfacial constant $k_1$ which can be calculated from resistance measurements and the corresponding changes in electrode positions (i.e., $k_1 = \rho t$).

Figure 2:
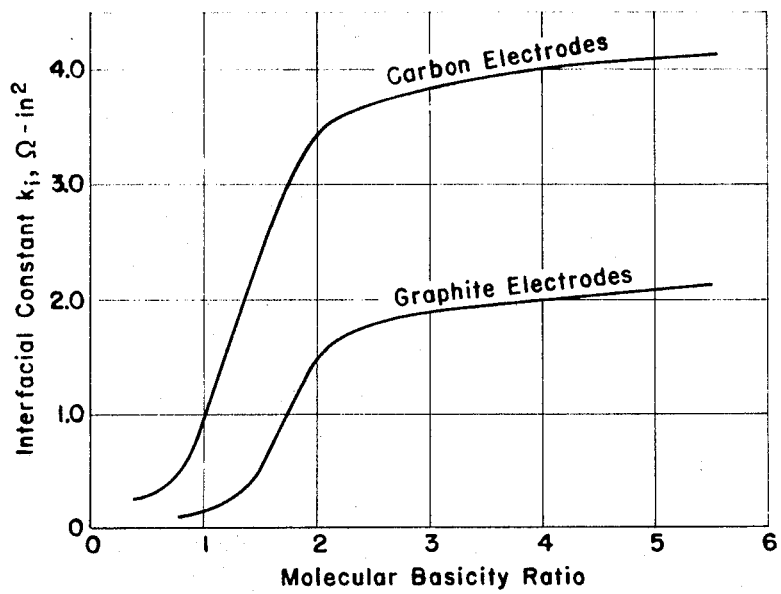
FIG. 2 is a plot showing the relation between slag basicity and the electrode/slag interfacial constant ($k_1$) for carbon and graphite electrodes.
Figure 3:
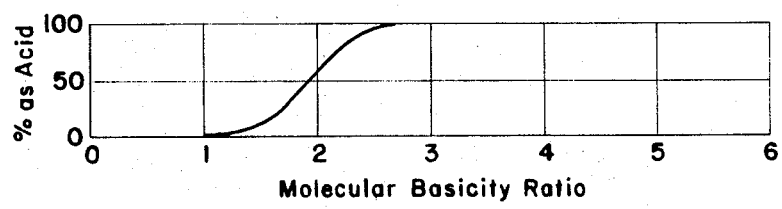
FIG. 3 is a plot showing the change of certain amphoteric slag components from base to acid with basicity.

We have found that the interfacial constant $k_1$ is a function of the type of carbonaceous electrode used and the molecular basicity ratio of the slag. This relationship is shown in FIG. 2. Because of the amphoteric nature of alumina, chromium, and titanium, it is necessary in determining basicity ratios to ascertain the amount of each constituent which functions as either a base or an acid. We have determined that in the case of chromium and alumina, the percentage which acts in an acidic manner is as shown in FIG. 3. In the case of unfluxed titania slags, the divalent and trivalent titanium act as bases. In summary, the molecular basicity ratio is determined by dividing the mole fractions of all bases plus the portion of the amphoteric oxides acting as bases by the mole fractions of all acids plus the portion of the amphoteric oxides acting as acids.

It is a unique feature of properly designed corona furnaces that the power factor is high and we have found that in our electrical calculations, it is suitable to use a power factor of .95. By Ohm's law then:

$$\frac{0.95 P \times 1000}{3} = \frac{\left(\frac{E}{1.732}\right)^2}{2R} \quad (3)$$

where P is the three phase kva. power at the electrode tip, E is the phase-to-phase voltage at the electrode tip and R is the resistance at single electrode. Substituting (1) and (2) in (3) and solving for E, this becomes $$E = \sqrt{\frac{2420 P k_i}{d^2 + dl}} \quad (4)$$

For corona discharge $l$ may vary from 0 to one inch. Thus, the voltage is restricted by the following relationship:

$$\sqrt{\frac{2420 P k_i}{d^2}} > E > \sqrt{\frac{2420 P k_i}{d^2 + 4d}} \quad (5)$$

By adding the voltage losses from the bus work, electrode clamps, and electrodes to E above, the proper voltage tap at the transformer may be determined.

As noted above, a power factor of 0.95 is achievable and is preferred. However, Equation 5 may be used with other power factors ($F_p$) by merely substituting $2543(F_p)$ for the 2420 figure.

The operation of the method of the invention on a practical level can thus be summarized as follows: The basicity of the slag is calculated as set forth hereinabove, and the interfacial constant (for the electrode material in use) is estimated (from FIG. 2). The voltage range for corona heating is then calculated from Equation 5, the factors P and $d$ being known. The appropriate transformer tap is then selected. The slag composition is selected for minimum viscosity as required by the volatile content of the charge, and hearth loading is maximized. Obviously, the slag viscosity is of less importance with low-volatile charges such as scrap. For optimum operation, the furnace should be equipped to charge the burden centrally between the electrodes, and also at a plurality of points outside the immediate electrode area. This provides flexibility in charge distribution. Since the electrodes are accurately positioned for corona heating and there is no arc radiation, it is not necessary to bank the charge along the sidewalls, as taught by prior workers, for refractory protection.

Once a slag bath has been established and the electrodes positioned as stated, charging is carried out continuously until just before tap. A free flowing charge is required, for obvious reasons. An advantageous feature of the present invention is that it can be adapted to essentially continuous steelmaking operations, i.e., there is no need for a refining period. To accomplish this a highly metallized burden is considered essential, since large quantities of reductant in the burden will cause carbon to dissolve in the metal, requiring decarburization (although this can be done in a ladle after tap). Charge impurities (sulfur, phosphorus, etc.) are continually scavenged by the slag which has an appropraite composition for this purpose.

The following examples demonstrate the application of our invention to the smelting of an iron ore.

EXAMPLE 1

Three different magnetite ores were blended in a fixed ratio to give the following blended composition:

| | |
|---|---|
| Fe total | 53.9 |
| Fe++ | 13.1 |
| $SiO_2$ | 9.2 |
| $Al_2O_3$ | 2.7 |
| MgO | 2.0 |

Burnt lime was used as flux and a high ash anthracite was used as reductant. Analyses of these constituents were:

Lime

| | |
|---|---|
| CaO | 88.1 |
| $SiO_2$ | 1.7 |
| L.O.I. | 6.6 |

Anthracite

| | |
|---|---|
| F.C. | 80.5 |
| V.M. | 6.1 |
| Ash | 13.5 |

Ash constituent

Fe₂O₃ ............................................. 22.5
SiO₂ ............................................. 39.1
Al₂O₃ ............................................ 18.5
CaO ............................................. 5.6
MgO ............................................. 3.8

The ore was calcined and then prereduced in a rotary kiln in three separate operations to give levels of reduction of the iron of 39%, 70%, and 93%. The residual iron oxide content in kiln discharge was 14, 7, and 2%, respectively. The rotary kiln was 4½ ft. I.D. x 80 ft. long. For the first period, the charge components were charged loose as —¼" particles with the coal added on the side in accordance with our previous practice as set forth in U.S. Pat. No. 3,206,300. For the other two periods, the fluxed charge was pelletized with the coal in the pellet according to U.S. Pat. No. 3,400,179. Data for charge ratios are:

|  | Period 1, 39% reduction | Period 2, 70% reduction | Period 3, 93% reduction |
|---|---|---|---|
| Calcined ore | 1.00 ton | 1.00 ton | 1.00 ton |
| Burnt lime | .16 ton | .16 ton | .16 ton |
| Anthracite to kiln | .24 ton | .30 ton | .30 ton |
| Anthracite to furnace | .40 ton |  |  |

In all instances, the hot prereduced charge was fed to the furnace continuously except during tapping. The furnace had initially a 1000-kva. transformer. This was later changed to a 5000-kva. transformer. The furnace shell was 7'8" inside brick diameter, and was initially equipped with 12" dia. carbon electrodes. In this furnace, there was a 5-volt drop from the transformer to the tip of the electrode.

The composition of the slags produced throughout the campaign had an average composition as shown in Table 1. For this slag, 30% of the Al₂O₃ acts as an acid and 70% as a base. Accordingly, the molecular basicity ratio was 1.77.

Campaign 1

In the first campaign, the hot 39% reduced charge was fed to the furnace at a rate of 2100 pounds per hour with an average power input of 926 kw./hr. Charging of the furnace was carefully regulated in accordance with the average power input so that the charge was uniformly consumed across the furnace diameter. The charging was done essentially through a central hole which piled the charge in a shallow cone over the surface of the slag between the electrodes. At the charge and power rate used, the charge height at each electrode was never more than 4". Periodically, a small amount of charge was fed behind each electrode as required to off-set potential overheating of the walls. The slags produced had a tap temperature of 1400° C. and viscosity of from 30 to 40 centipoises as measured by the run-off rate from an iron stirring rod. At an operating phase-to-phase tap voltage of 142, the 12-inch carbon electrodes were immersed in an average of 4.6" in the slag. Because of a high electrode consumption, the voltage was then increased to 175 volts which raised the electrodes to around a 2" immersion. At this immersion level, satisfactory electrode consumption was experienced. At the end of the campaign, the furnace was cleaned out. The measured smelting zone had an area of 38.4 sq. ft. to give an average power loading during the campaign of 24.1 kw./sq. ft. of hearth. No attempt was made to refine the low carbon metal which was produced. However, if desired, the charging could be interrupted after the slag was tapped and a desulfurizing slag added for refining.

Campaign 2

In a second campaign, the electrode holders were changed to allow the use of 6" carbon electrodes and a 500 kw. transformer installed. Smelting conditions were the same except that it was necessary to increase the phase-to-phase voltage to 311 in order to have an electrode immersion of 1.6 inches. It was now possible to raise the power although because of overloading of the carbon electrodes, it was necessary to replace the carbon electrodes by graphite. An average loading close to 2000 kwh./hr. and a feed rate of 5000 lbs./hr. of 39% prereduced ore/hr. was used. Under these conditions, the electrode immersion was a little more than ½ inch. However, because of the greater rate of gas evolution, it was necessary to change the viscosity of the slag to avoid foaming at this higher power load. Accordingly, the amount of feed in the center was decreased by 60% and the side feed behind each electrode increased accordingly. Feeding was done so as to allow the charge to reach a cherry red heat before new feed was added. In this manner, the temperature of the slag increased from 1400 to 1550° C. As a result of the increase in temperature, the viscosity decreased from 40 to approximately 7 centipoises, and the foaming essentially subsidized.

Campaign 3

In a third campaign, the 70% reduced pellet charge with the coal and flux incorporated in the pellet was used as the only feed to the furance. Operating conditions were essentially the same as for Campaign 2, except that a colder slag could be used which allowed a less careful adjustment in feeding the furnace. Slags with viscosities in the 25 to 30 centipoise range were obtained with feed rates of 8500 pounds of hot prereduced charge per hour. Charging practice was adjusted so that the charge just touched the electrodes as it melted. Electrode immersion remained essentially ½" in the slag. Hearth loadings in Campaign 3 were approximately 51 kw./sq. ft. of hearth.

Campaign 4

In this campaign, the 93% reduced pellets were used. It was possible for a brief period to double the power input to 4000 kw. before the 6" graphite electrode deteriorated significantly. Under these conditions, the electrode immersion averaged approximately 2.8 inches.

Campaign 5

To obtain better electrode life, the electrode holders were adapted to take 8" graphite electrodes and melting of the 93% reduced charge was continued, but with full power loading of 5000 kw. Under these conditions, the electrodes rose to a little less than 2" immersed in the slag. Average charge rate was 40,000 pounds of reduced pellets per hour. Because of the small volume of gases evolved, it was possible to again feed 90% of the charge through the central feed hole as long as the rate was controlled so that a ½" ring of molten slag free of charge was maintained around each electrode. Again, a small amount of charge was fed behind each electrode as required to protect the sidewalls. With the feed practice used, the slags had a temperature of 1500° C. and a viscosity of about 25 centipoises. In this campaign, a hearth loading of 110 kw./sq. ft. was obtained.

EXAMPLE 2

Table 1 lists five other slags used to practice the invention. The fluxed nickel residue had an initial residual oil content of 10%. Attempts to furnace this cold material at a hearth loading of 60 kw./sq. ft. were unsuccessful as a result of severe foaming of the slag. By preheating the charge and burning off the residual oil content to give 4% remaining in the residue, it was possible to significantly increase the throughput through the same furnace without prohibitive amounts of slag foaming. This slag had a basicity ratio of 4.34 and a $k_1$ for graphite electrodes 2.05Ω-in.² In a furnace equipped with 6" graphite electrodes, operating at 1000 kva., the transformer tap voltage range for operating at the desired electrode immersion was from 259 to 375 tap volts. However, the transformer had a maximum 200 volts at which tap the electrodes were immersed 4" in the slag. Operations were satisfactory except for a higher than normal amount of electrode consumption.

EXAMPLE 3

The chromium ore was initially prereduced to a residual oxygen content of 14% and then smelted at a hearth loading of 15 kw./sq. ft. At a slag temperature of 1500° C., there was no foaming. When the ore was prereduced to a residual oxygen content of 4% and then smelted in a furance with a hearth loading of 85 kw./sq. ft., it was necessary to raise the slag temperature to 1600° C. to avoid foaming. The slag had a basicity ratio of 1.98 and a $k_1$ of 3.04 for carbon electrodes. Smelting was done in a furance equipped with 12" graphite electrodes. At a 1000 kva. loading, the desired operating transformer top voltage ranged from 180 to 230 volts.

EXAMPLE 4

The fluxed stainless swarf had a residual volatile content of 8% consisting principally of residual oils and unreduced chromium and iron oxides. In operating in a furnace equipped with 6" graphite electrodes and a hearth loading of 60 kw./sq. ft., it was necessary to keep the slag temperature in excess of 1600° C. to avoid foaming. When the swarf was added cold, this slow feed rate, required to keep the slag hot, resulted in low throughput. The swarf was then preheated, burning off some more oil so that the residual volatile content was lowered to around 5%. The warm swarf could then be charged at a high rate and throughputs were approximately double. The slag had a basicity ratio of 2.07 and a $k_1$ of 1.57 for graphite electrodes, at a 1000 kva. load. For proper electrode positioning, the furnace was operated either at the 140 or the 160 voltage tap.

EXAMPLE 5

The unfluxed flue dusts were pelletized and prereduced to a 70% metallization and smelted cold at 125 kva. in a furnace equipped with 5⅛" graphite electrodes. The prereduced pellets had a residual oxygen content of 5.4%. The furnace had a hearth loading of 25.4 kw./sq. ft. The slags had a temperature of 1400° C. and a viscosity of 40 centipoises. From the curve of FIG. 1, it would have been possible to have doubled the power loading on the furance without serious difficulty. The slag had a basicity ratio of 1.74 and a $k_1$ value of 0.95 for graphite electrodes. The desired operating voltage range was from 68 to 112 tap volts.

EXAMPLE 6

The unfluxed titaniferous ore was reduced to the 50% level and charged hot to a furance equipped with 12" carbon electrodes. The residual oxygen content of the reduced ore was 12% and the hearth loading on the furnace was 25 kw./sq. ft. The slags had a tap temperature of 1550° C. At this temperature, the slag viscosity was sufficiently low that very little foaming occurred during smelting. The slags had a basicity ratio of 0.72 and a $k_1$ for carbon electrodes of 0.44. Operating voltages ranged from 72 to 90 tap volts.

Subsequently, the ore was pelletized with coal inside the pellet and reduced to give 95% metallization of the iron. This reduced ore with a residual oxygen content of 1% could be successfully melted at very high throughput rates when the hearth loading was increased to 140 kw./sq. ft.

Various changes in the details, steps, materials and arrangements of parts, which have been herein described and illustrated in order to explain the nature of the invention, may be made by those skilled in the art within the principle and scope of the invention as described in the appended claims.

TABLE 1.—COMPOSITION, BASICITY AND VISCOSITY OF SLAGS USED FOR EXAMPLES

| | Composition, weight percent | | | | | | | | | Viscosity, centipoises | | |
|---|---|---|---|---|---|---|---|---|---|---|---|---|
| | CaO | MgO | FeO | MnO | $Cr_2O_3$ | $Al_2O_3$ | $TiO_2$ | $SiO_2$ | Basicity ratio | $K_i$ | 1,400° C. | 1,500° C. | 1,700° C. |
| Fluxed magnetite ore | 40 | 4 | 6.4 | 3.4 | | 12 | | 32 | 1.77 | 3.05 c. | 40 | 10 | 2 |
| Fluxed nickel residue | 70 | 1 | 2.5 | | | 19 | | 7 | 4.34 | 2.05 g. | 150 | 50 | 25 |
| Fluxed chromium ore | 3 | 23 | 2.6 | | 7.0 | 31 | | 28 | 1.98 | 3.04 c. | 70 | 30 | 10 |
| Fluxed stainless swarf | 60 | 1 | 5.1 | | 1.7 | 12 | | 27 | 2.07 | 1.57 g. | 70 | 30 | 10 |
| Unfluxed flue dusts | 35 | 12 | 7.0 | | | 9 | | 36 | 1.74 | 0.95 g. | 40 | 10 | 2 |
| Unfluxed titaniferous ore | 1 | 11 | 6.0 | | | 13 | 65 | 5 | 0.72 | 0.44 c. | 70 | 30 | 10 |

What is claimed is:

1. A process for melting a metallurgical burden to produce iron or an iron alloy in an electric furnace having carbon or graphite electrodes comprising:

establishing within said furnace a molten metal layer and an overlying molten slag layer;

supplying a voltage to the electrode tips to maintain a corona discharge between the tips of the furnace electrodes and the slag bath, the tips of said electrodes being maintained at a level no more than one inch deeper in said slag than the level at which said corona is initially established, whereby arcing is avoided and heat is generated in the immediate vicinity of said electrode tips;

said slag having a thickness of greater than one inch;

said slag being maintained at as low a viscosity as possible without substantially exceeding the desired tapping temperature;

supplying electric current to said electrodes so as to maximize the hearth loading without causing said slag to foam; and periodically tapping metal and slag from said furnace.

2. The method of claim 1 wherein the voltage E supplied to said electrode tips to effect corona heating is a function of the interfacial film resistivity around the electrode tip, the three-phase power at the electrode tips and the electrode diameter, and is defined by the relation $$\sqrt{\frac{2543(F_p)Pk_i}{d^2}} > E > \sqrt{\frac{2543(F_p)Pk_i}{d^2+4d}}$$

where $F_p$=the power factor, at least 0.9;

P=three-phase power at the electrode tip, in kva.;

$k_i$=an inter-facial constant having a value of from 0.2 to 4.8 ohm-in.$^2$ and is equal to $\rho t$, where $\rho$ is the resistivity of the interfacial film at the electrode tip and $t$ is the film thickness; and d=electrode diameter.

3. The method of claim 2, wherein $k_i$ is estimated as a function of slag basicity and electrode material, as set forth in FIG. 2.

4. The method as claimed in claim 1, wherein the hearth loading is a function of slag viscosity at tapping temperature and the volatile content of said burden, as set forth in FIG. 1.

5. The method as claimed in claim 1 wherein the composition of the burden, at each moment of charging, is the desired metal and slag compositions plus volatiles.

6. The method of producing molten ferrous metallurgical bath under a liquid slag cover of at least one inch thickness with periodic tapping, in an electric furnace provided with alternating current by means of carbonaceous electrodes, which comprises:

charging said furnace continuously with free-flowing particles of a metallurgical burden in the proportions suitable to yield the desired compositions of said bath and slag at such a rate that said desired compositions are reached in each moment of the charging period at least to a significant degree;

supplying a voltage to said electrodes to position the tips of said electrodes in regard to the level of said slag to maintain a corona around said tips; and supplying sufficient current to approach, in each moment of the charging period, the desired final temperatures of the metal bath and slag before tapping.

7. The method of claim 6, wherein the tips of said electrodes are maintained no more than one inch deeper in said slag than the position at which said corona is initially established.

8. The method of claim 6, wherein the iron content of said burden is at least about 90% in the metallic state, and said burden contains fluxes capable of binding sulfur and phosphorus impurities in said burden.

9. The method of claim 6, wherein the viscosity of said slag is maintained at a level at which the volatiles in said burden cannot cause foaming thereof at the applied current density.

References Cited

UNITED STATES PATENTS

| | | | |
|---|---|---|---|
| 3,152,372 | 10/1964 | Hopkins | 164—52 |
| 3,167,420 | 1/1965 | Robiette | 75—11 |
| 3,234,608 | 2/1966 | Peras | 164—52 |

HIRAM B. GILSON, Primary Examiner

U.S. Cl. X.R.

75—11